United States Patent
Bologna

(10) Patent No.: US 7,041,023 B2
(45) Date of Patent: May 9, 2006

(54) MOTOR-DRIVEN AXLE FOR A MOTOR VEHICLE

(75) Inventor: Luciano Bologna, Rivoli (IT)

(73) Assignee: Graziano Trasmissioni S.p.A., (IT)

(*) Notice: Subject to any disclaimer, the term of this patent is extended or adjusted under 35 U.S.C. 154(b) by 108 days.

(21) Appl. No.: 10/818,646

(22) Filed: Apr. 6, 2004

(65) Prior Publication Data

US 2005/0006967 A1  Jan. 13, 2005

(30) Foreign Application Priority Data

Apr. 7, 2003 (IT) ............................ T02003A0267

(51) Int. Cl.
 *F16H 48/30* (2006.01)
(52) U.S. Cl. ................................ 475/150
(58) Field of Classification Search ............... 475/150; 180/65.6
 See application file for complete search history.

(56) References Cited

U.S. PATENT DOCUMENTS

| | | | |
|---|---|---|---|
| 5,080,640 A | * | 1/1992 | Botterill ............. 475/231 |
| 5,715,901 A | * | 2/1998 | Tokushima ........... 180/65.6 |
| 5,743,348 A | * | 4/1998 | Coppola et al. ....... 180/65.6 |
| 6,832,972 B1 | * | 12/2004 | Ishikawa ............. 475/223 |

* cited by examiner

Primary Examiner—Dirk Wright
(74) Attorney, Agent, or Firm—Cook, Alex, McFarron, Manzo, Cummings & Mehler, Ltd.

(57) ABSTRACT

The axle comprises:
 an axle housing including an intermediate casing containing a lubricant and in which a reduction gear unit, coupled to a differential, is mounted,
 two drive-shafts coupled to the differential, and
 a rotary electric drive motor having a shaft a first end of which extends into the casing where it is engaged in the tubular hub of an input sprocket of the reduction unit.

The input sprocket of the reduction unit is supported for rotation in the casing by means of a first bearing which is keyed to an axial portion of the hub of the sprocket, which axial portion extends on the side of the teeth of the sprocket remote from the motor.

The shaft of the electric motor is cantilevered by means of a second bearing which is keyed to the end of the shaft remote from the first end.

6 Claims, 4 Drawing Sheets

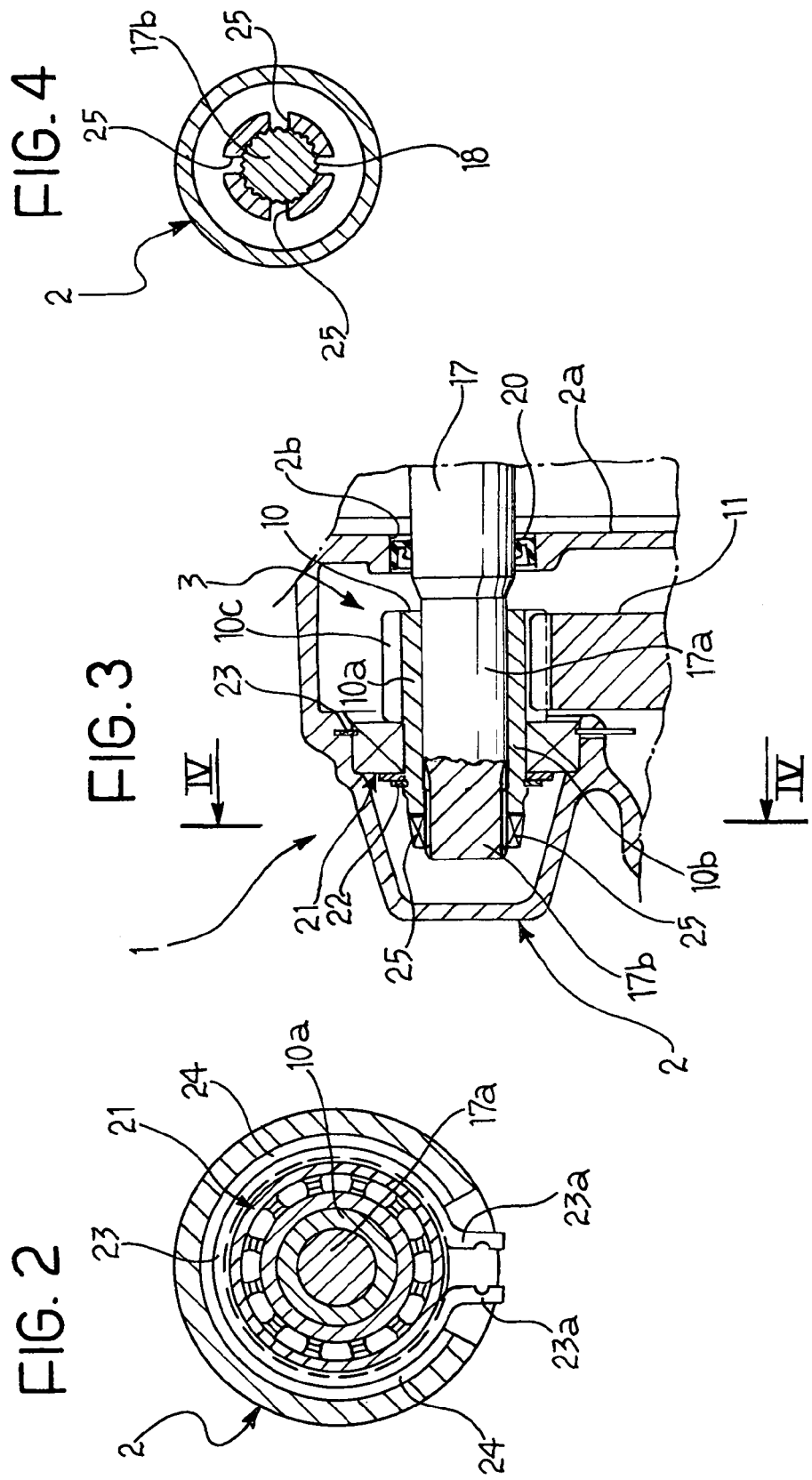

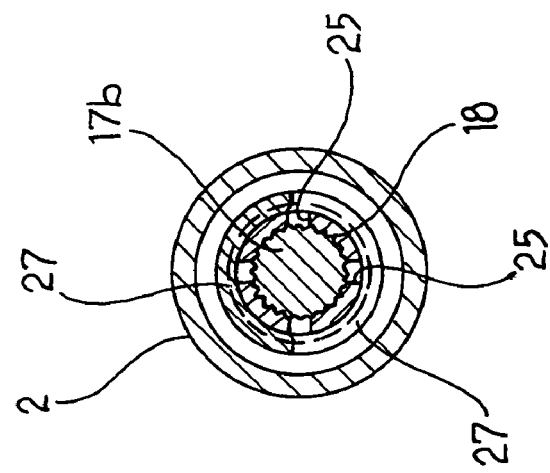
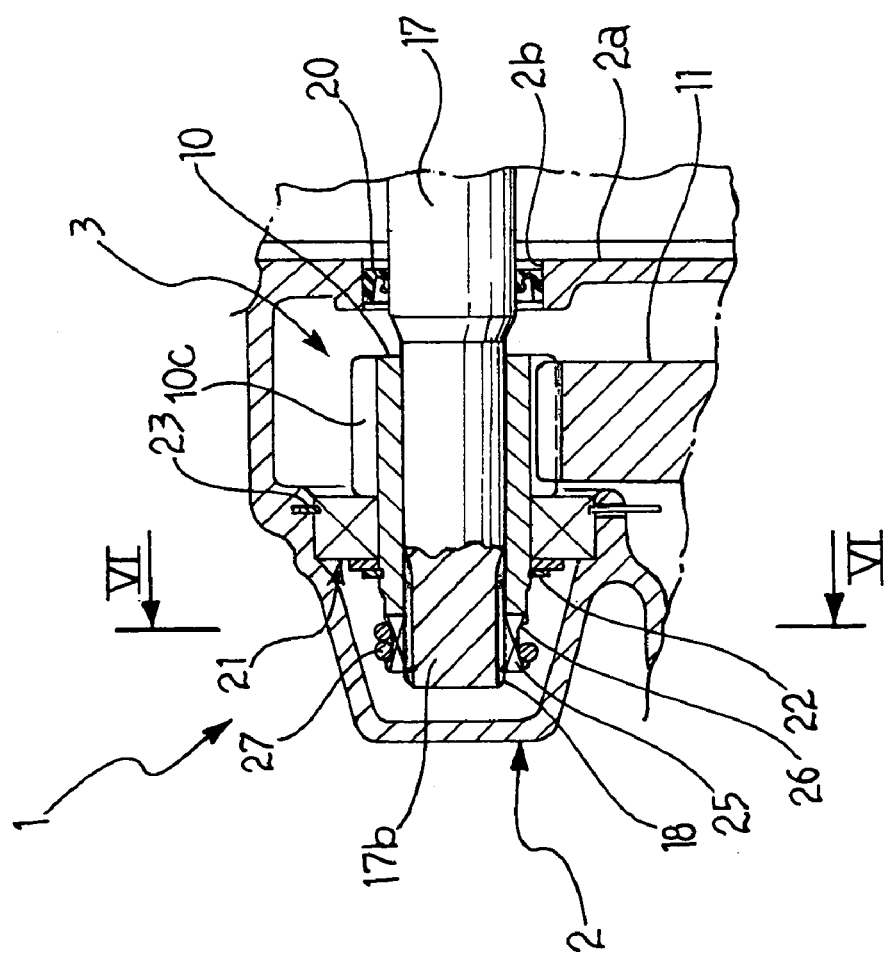

MOTOR-DRIVEN AXLE FOR A MOTOR VEHICLE

The present invention relates to a motor-driven axle for a motor vehicle.

More specifically, the subject of the invention is a motor-driven axle of the type comprising:
- an axle housing including a casing which can contain a lubricant and in which a reduction gear unit, coupled to a differential, is mounted,
- two drive-shafts coupled to the differential, and
- a rotary electric drive motor having a shaft a first end of which extends into the casing where it is engaged in the tubular hub of an input sprocket of the reduction unit.

A motor-driven axle of this type, in which the shaft of the electric drive motor is supported for rotation at both of its ends by means of corresponding bearings, is known. An end of the shaft projects from the motor casing or housing and extends inside the axle casing. The input gear of the reduction gear unit is constituted by a sprocket which is cantilevered on the end of the shaft of the electric drive motor; the sprocket may be formed integrally with the shaft of the drive motor or may be formed as a separate part fixed to the end of the shaft of the drive motor in a manner known per se. In a motor-driven axle of this type, bending of the shaft of the electric drive motor may lead to non-uniform contact of the teeth of the sprocket with those of the gear which meshes therewith. This may lead to premature wear of the teeth and problems of noisiness in operation.

An object of the present invention is to propose a motor-driven axle which overcomes the above-mentioned disadvantages of the solution according to the prior art discussed above.

This and other objects are achieved according to the invention by a motor-driven axle of the type specified above, characterized in that:
- the input sprocket of the reduction unit is supported for rotation in the casing by means of a first bearing which is keyed to an axial portion of the hub of the sprocket, which axial portion extends on the side of the teeth of the sprocket remote from the electric drive motor, and
- the shaft of the rotor of the electric motor is cantilevered by means of a second bearing which is keyed to the second end of the shaft, remote from the first end.

Figure 1:
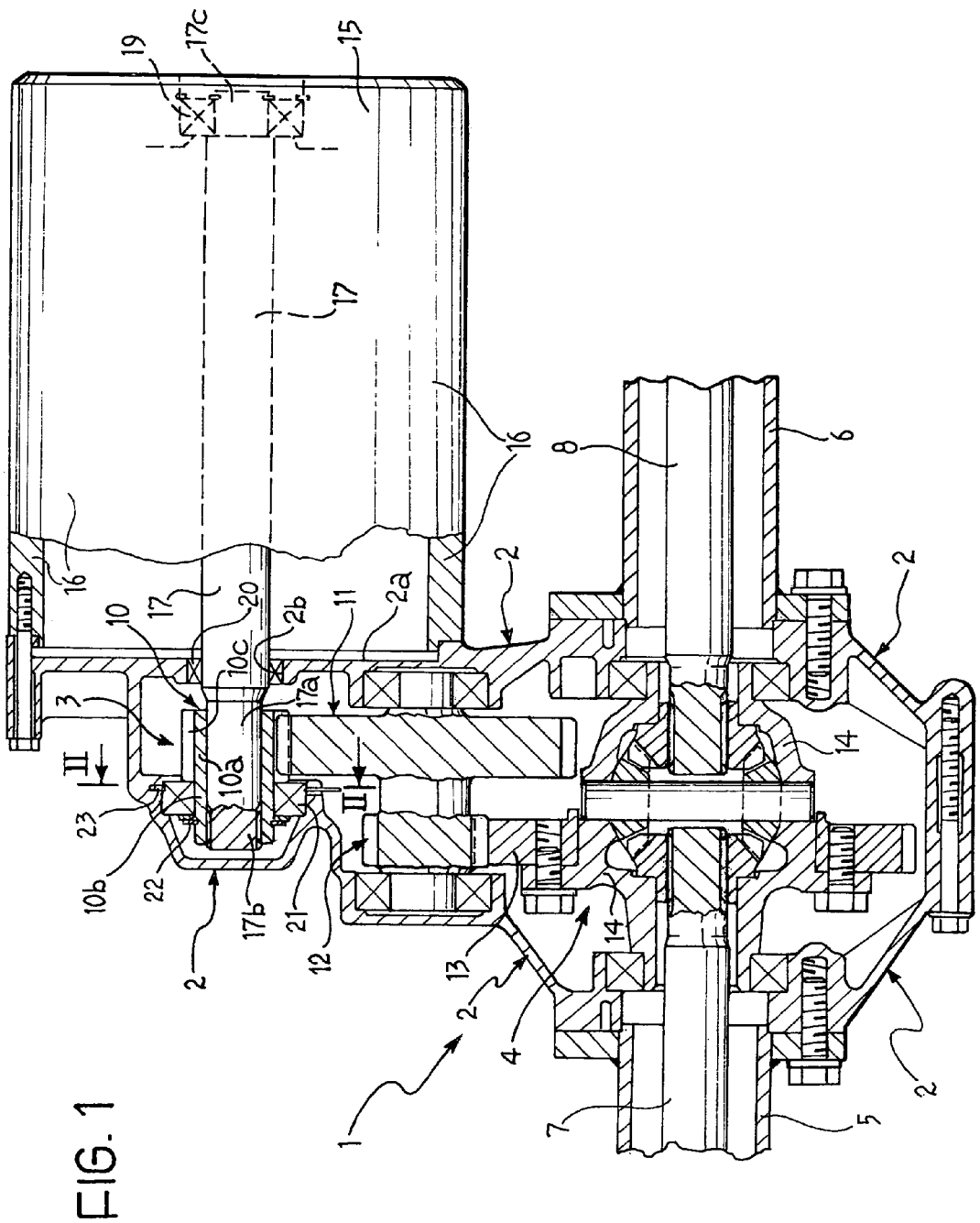
Figure 7:
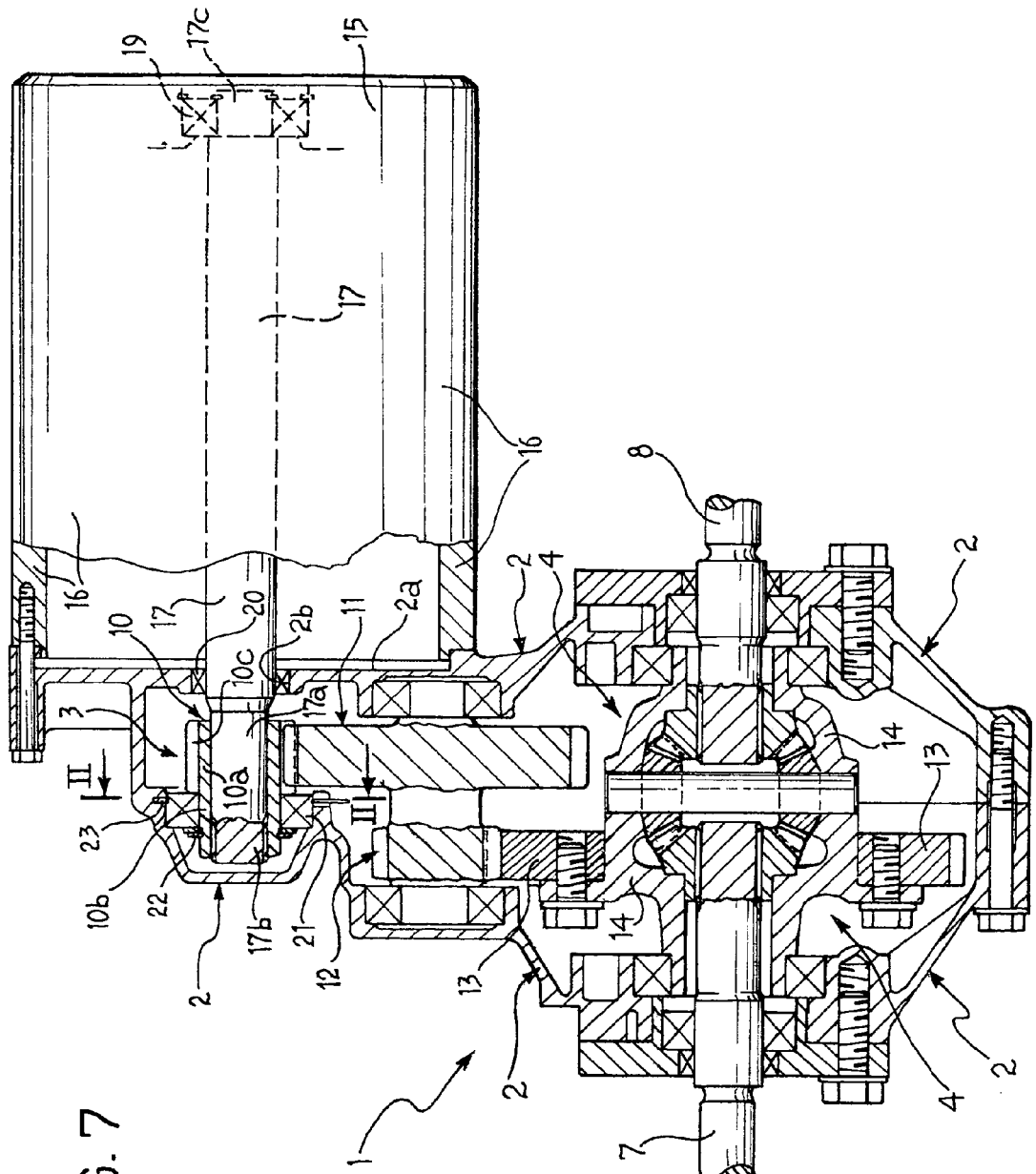

Further characteristics and advantages of the invention will become clear from the following detailed description, which is given purely by way of non-limiting example, with reference to the appended drawings, in which:

FIG. 1 is a partially-sectioned, partial side view of a motor-driven axle according to the invention, FIG. 2 is a view sectioned on the line II—II of FIG. 1, FIG. 3 is a partial sectioned view which shows a first variant of embodiment, FIG. 4 is a view sectioned on the line IV—IV of FIG. 3, FIG. 5 is a partial sectioned view which shows a further variant of embodiment, FIG. 6 is a view sectioned on the line VI—VI of FIG. 5, and FIG. 7 is similar to FIG. 1 and shows another axle according to the invention.

A motor-driven axle according to the invention is generally indicated 1 in FIG. 1. The axle comprises a rigid support housing including an intermediate casing 2 in which a reduction gear unit, generally indicated 3, and a differential 4, which are coupled with one another, are mounted in an oil bath. The axle housing also comprises two lateral arms 5 and 6 in which respective drive-shafts 7 and 8 extend, coupled with the differential 4 in a manner known per se.

In the embodiment shown, the reduction unit 3 is of the geared type with two reduction stages and comprises an input sprocket 10 which meshes with a gear 11 which is fixed firmly to and coaxial with another, axially offset sprocket 12 which in turn meshes with a gear 13 fixed to the casing 14 of the differential 4.

The motor-driven axle 1 further comprises a rotary electric drive motor, generally indicted 15 in FIG. 1. The motor comprises a substantially beaker-shaped housing or casing 16 fixed to a wall 2a of the casing 2.

The motor 15 comprises, in a manner known per se, a rotor provided with a shaft 17, of which a first, preferably tapered end 17a extends into the casing 2 through an opening 2b of the wall 2a and engages in the tubular hub 10a of the input sprocket 10 of the reduction unit 3.

The distal or end portion 17b of the shaft 17 of the motor 15 has a splined external profile which engages with a corresponding splined internal profile of the tubular hub 10a of the sprocket 10.

The opposite end 17c of the shaft 17 of the electric motor 15, on the other hand, is cantilevered by means of a bearing 19, as shown partially in broken outline in FIG. 1.

A sealing ring 20 is disposed in the opening 2b of the casing and bears against the surface of the shaft 17.

The input sprocket 10 of the reduction unit 3 is supported for rotation in the casing 2 by means of a bearing 21 which is keyed to an axial end portion 10b of the hub of the sprocket 10 which end portion 10b extends on the side of the teeth 10c of the sprocket 10 remote from the electric motor 15.

The bearing 21 is clamped axially relative to the hub of the sprocket 10 by means of a resilient split ring 22 engaged in a peripheral groove formed in the hub of the sprocket 10. The bearing 21 is also clamped axially relative to the casing 2 by means of a second, safety resilient split ring 23 which is resiliently expandable and re-contractible radially and is engaged partially in a groove 24 formed in the casing 2 (see FIG. 2) and partially in a corresponding groove formed in the periphery of the outer ring of the bearing 21.

During assembly, the bearing 21 is first of all mounted on the hub of the sprocket 10 and secured thereon by means of the resilient ring 22. The resilient safety ring 23 is then picked up and a contraction of its outside diameter is brought about by moving its ends 23a towards one another (FIG. 2) so as to enable it to be inserted in the channel or groove 24 provided in the casing 2. The appendages 23a of the safety ring 23 are then moved apart so that, in that condition, the ring extends entirely within the groove 24 of the casing 2. In that condition, the sprocket 10 with the associated bearing 21 can be inserted in the mounting position provided in the casing 2 by passing through the resilient ring 23 which is kept radially expanded.

When the ends 23a of the safety ring 23 are then released, the ring becomes inserted partially in the groove correspondingly provided in the outer ring of the bearing 21, restraining the bearing axially relative to the casing 2.

FIGS. 3 and 4 show a partial variant. In this variant, the splined portion of the hub 10a of the sprocket 10 and the corresponding splined portion of the end 17b of the shaft 17 of the drive motor are longer. Advantageously, at least the axial portion 10b of the hub of the sprocket 10 that extends axially on the side of the bearing 21 remote from the teeth 10c is treated thermally, for example, by means of a case-hardening, quenching and tempering process so as to induce residual tensions in that portion as a result of the transformation of the structure of the steel brought about by the heat treatment. End notches 25 are then formed in the axial portion of the hub of the sprocket 10; these notches can release at least some of the above-mentioned tensions so as to bring about a centripetal tightening of that axial portion of the hub of the sprocket 10 onto the corresponding axial end portion 17b of the shaft 17 of the electric drive motor. The coupling consequently no longer has any circumferential play in the region of the splined coupling between the shaft 17 and the hub of the sprocket 10, but tends rather to have interference. The play in the splined coupling is thus cancelled out, with consequent advantages in the transmission of the drive from the motor 15 to the reduction unit 3 and an advantageous reduction in operating noise.

FIGS. 5 and 6 show a further variant. In this variant, parts and elements already described have again been attributed the same reference numerals.

In this variant, a peripheral groove or channel 26 (FIG. 5) is formed in the axial portion of the hub of the sprocket 10, in which notches 25 are formed; a helical spring 27 is mounted in the peripheral groove or channel 26 and is preloaded radially so that it tends to tighten the axial portion of the hub of the sprocket 10 further radially onto the corresponding axial portion 17b of the shaft 17 of the electric drive motor.

This solution further increases the effect of the elimination of the play in the splined coupling between the sprocket 10 and the shaft 17 of the electric drive motor. Furthermore, in contrast with a conventional interference fit, the above-described solution permits easy coupling of the shaft 17 of the drive motor with the axle and subsequent uncoupling thereof given that, unlike a conventional force fit, there is still substantially a sliding type of coupling which simply requires a slight increase in the load that is necessary to cause the splined end of the shaft 17 to slide in the splined hub of the drive sprocket 10 during the last portion of the mounting.

FIG. 7 shows a motor-driven axle 1 according to the invention in an embodiment for applications with independent suspension, that is, for the transmission of the drive to the wheels by means of constant-velocity joints. The axle housing accordingly comprises only the casing 2 and not the tubular branches or arms 5 and 6 of FIG. 1.

The motor-driven axles according to the present invention as described have many advantages.

In the first place, they require the use of only two bearings for supporting the shaft 17/sprocket 10 assembly. The cost of the electric drive motor 15 is low in view of the fact that its shaft 17 is supported in the casing 16 by means of a single bearing 19 with the cantilevered arrangement. Moreover, the drive sprocket 10 is not cantilevered and this ensures optimal meshing conditions between its teeth 10c and those of the gear 11 with which it cooperates directly.

The electric drive motor 15 can easily be coupled with and uncoupled from the rest of the motor-driven shaft.

The splined coupling between the shaft 17, 17b of the electric motor 15 and the input sprocket 10 of the reduction unit is in an oil bath, that is, it is lubricated and is not therefore subject to wear by corrosion due to fretting as usually occurs in the dry splined couplings which are typically used in applications of this type.

Upon completion of the production and assembly cycle, the mechanical portion of the motor-driven axle 1, that is, the axle without the electric motor 15, can be subjected to functional tests and checking of noise levels after mounting on a test bench on which there is an electric motor which is coupled with the drive sprocket 10 of the geared reduction unit 3. This enables the characteristics of the axle to be assessed objectively.

Naturally, the principle of the invention remaining the same, the forms of embodiment and details of construction may be varied widely with respect to those described and illustrated purely by way of non-limiting example, without thereby departing from the scope of the invention as defined in the appended claims.

What is claimed is:

1. A motor-driven axle for a motor vehicle, comprising:
an axle housing including an intermediate casing which can contain a lubricant and in which a reduction gear unit, coupled to a differential, is mounted,
two drive-shafts coupled to the differential, and
a rotary electric drive motor having a shaft, a first end of said shaft extends into the casing where said shaft is engaged in the tubular hub of an input sprocket of the reduction unit and is supported for rotation by no more than two bearings,
the input sprocket of the reduction unit being supported for rotation in the casing by means of a first bearing which is keyed to an axial portion of the hub of the sprocket, which axial portion extends on the side of the teeth of the sprocket remote from the motor, and
the shaft of the electric motor being cantilevered by means of a second bearing which is keyed to the end of the shaft remote from the first end.

2. An axle according to claim 1 in which the first bearing:
is clamped axially relative to the hub of the input sprocket of the reduction unit by means of a resilient split ring engaged in a peripheral groove formed in the hub of the input sprocket, and
is clamped axially relative to the casing by means of a second, safety resilient ring which is resiliently expandable and re-contractible radially and is engaged partially in a groove formed in the casing and partially in a corresponding groove formed in the periphery of the first bearing.

3. An axle according to claim 1 in which the input sprocket is permanently rigid for rotation with the shaft.

4. An axle according to claim 3 in which the input sprocket has a splined internal profile and the shaft has a splined external profile which engages the splined internal profile of the sprocket.

5. A motor-driven axle for a motor vehicle, comprising:
an axle housing including an intermediate casing which can contain a lubricant and in which a reduction gear unit, coupled to a differential, is mounted,
two drive-shafts coupled to the differential, and
a rotary electric drive motor having a shaft, a first end of said shaft extends into the casing where said shaft is engaged in the tubular hub of an input sprocket of the reduction unit,
the input sprocket of the reduction unit being supported for rotation in the casing by means of a first bearing which is keyed to an axial portion of the hub of the sprocket, which axial portion extends on the side of the teeth of the sprocket remote from the motor,
the shaft of the electric motor being cantilevered by means of a second bearing which is keyed to the end of the shaft remote from the first end, and
the axial portion of the hub of the sprocket is treated thermally so as to induce residual centripetal tensions therein, end notches then being formed in the said axial portion, which end notches can at least partially release the residual tensions so as to bring about a centripetal tightening of the said portion of the hub onto the corresponding axial portion of the shaft of the electric drive motor.

6. An axle according to claim 5 in which a peripheral groove or channel is formed in the axial portion of the hub of the input sprocket, in which groove or channel is mounted a helical spring which is preloaded radially so that it tends to tighten the axial portion of the hub radially onto the corresponding axial portion of the shaft of the electric drive motor.

* * * * *